United States Patent
Xiong et al.

(10) Patent No.: US 10,635,115 B2
(45) Date of Patent: Apr. 28, 2020

(54) RECHARGING ALIGNMENT METHOD OF ROBOT, AND THE ROBOT THEREOF

(71) Applicant: UBTECH Robotics Corp, Shenzhen (CN)

(72) Inventors: Youjun Xiong, Shenzhen (CN); Jiawen Hu, Shenzhen (CN); Gaobo Huang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 237 days.

(21) Appl. No.: 15/721,759

(22) Filed: Sep. 30, 2017

(65) Prior Publication Data
US 2018/0373261 A1    Dec. 27, 2018

(30) Foreign Application Priority Data
Jun. 27, 2017   (CN) .......................... 2017 1 0502200

(51) Int. Cl.
G05D 1/02    (2020.01)

(52) U.S. Cl.
CPC ......... G05D 1/0242 (2013.01); G05D 1/0225 (2013.01); G05D 1/0272 (2013.01); *A47L 2201/06* (2013.01); *G05D 2201/0203* (2013.01)

(58) Field of Classification Search
None
See application file for complete search history.

(56) References Cited

U.S. PATENT DOCUMENTS

| 4,777,416 A | * | 10/1988 | George, II | ........... | G05D 1/0225 |
|---|---|---|---|---|---|
| | | | | | 318/568.12 |
| 2007/0114975 A1 | * | 5/2007 | Cohen | ................... | A47L 9/2857 |
| | | | | | 320/149 |

FOREIGN PATENT DOCUMENTS

CN          103317509 A       9/2013

* cited by examiner

*Primary Examiner* — Bhavesh V Amin

(57) ABSTRACT

The present disclosure relates to a recharging alignment method of a robot and a robot thereof. The recharging alignment method includes adjusting a signal receiver of the robot to a first critical point to obtain position information of the first critical point, adjusting the signal receiver from the first critical point to a second critical point to obtain position information of the second critical point, determining a mid-point of the first critical point arid the second critical point according to the position information of the first critical point and the second critical point, and adjusting the signal receiver to the mid-point to align with the recharging dock, so as to accurately align with the recharging dock.

11 Claims, 4 Drawing Sheets

---

S11
Adjusting a signals receiver of the robot to a first critical point to obtain position information of the first critical point S12
Adjusting the signals receiver from the first critical point to a second critical point to obtain position information of the second critical point S13
Determining a mid-point of the first critical point and the second critical point according to the position information of the first critical point and the second critical point, and adjusting the signals receiver to the mid-point to align with the recharging dock

US 10,635,115 B2

RECHARGING ALIGNMENT METHOD OF ROBOT, AND THE ROBOT THEREOF

CROSS REFERENCE TO RELATED APPLICATIONS

This application claims priority to Chinese Patent Application No, 201710502200.0, filed Jun. 27, 2017, which is hereby incorporated by reference herein in its entirety.

BACKGROUND

1. Technical Field

The present disclosure relates to robot field, and more particularly to a recharging alignment method of a robot and a robot thereof.

2. Description of Related Art

With the evolution of the technology, robots, especially sweeping robots, have been a part of human's daily life, and the robots are deemed to be a trend in the future.

Currently, automatic recharging technology is usually adopted for recharging the robots, and a signals emitter is configured on the recharging dock to emit optical signals. If the robots receive the optical signals, the robots may configure such recharging dock as the destination, and may return to such recharging dock for recharging by automatic navigation. Usually, the optical signals of the recharging dock are emitted in a form of rays and may cover a certain range. As such, the signal receiver of the robots may receive the optical signals within a certain range, and signal receiver may be difficult to accurately align with the recharging dock.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, hut also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

Figure 1:
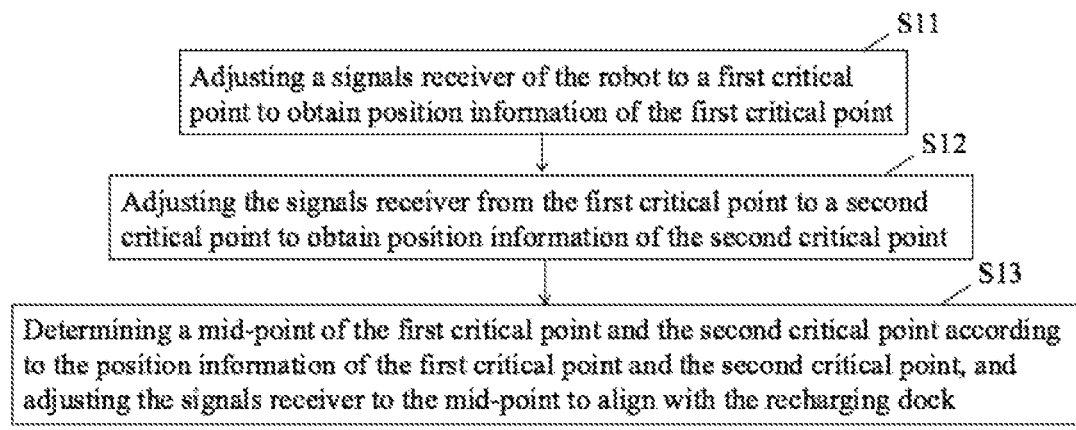
FIG. 1 is a flowchart illustrating a recharging alignment method of a robot in accordance with one embodiment of the present disclosure.

Referring to FIG. 1, the present disclosure relates to a recharging alignment method of a robot. The alignment method may include following steps.

In S11: adjusting a signal receiver of a robot to a first critical point to obtain position information of the first critical point, wherein the signal receiver is configured to receive optical signals emitted from a recharging dock of the first critical point.

Figure 2:
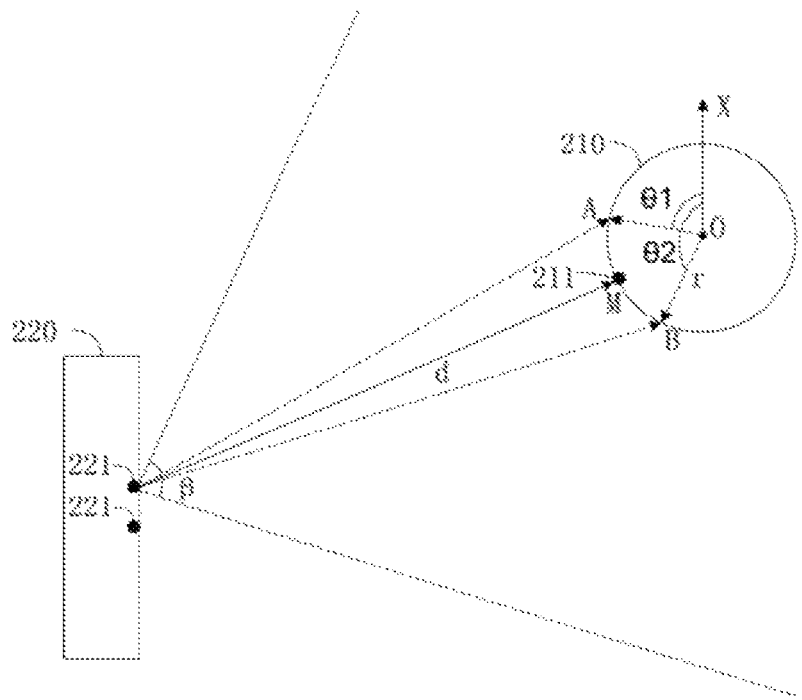
FIG. 2 is a schematic view of a system for robots in accordance with one embodiment of the present disclosure.

In one example, the robot may be a service-type robot, which may perform at least one of instructions, such as sweeping, singing, changing songs, dancing, telling stories, conducting response service, i.e. check the weather and check the current time. In another example, the robot may be an industrial type robot, and it's not limited in the present disclosure. The robot is capable of automatic recharging. A signals emitter is configured on a recharging dock of the robot, and the signals emitter is configured to emit optical signals. A signal receiver is configured on the robot, and is configured to receive the optical signals emitted from the recharging dock. The sweeping robot is considered to be an example. As shown in FIG. 2, the signal receiver 211 is configured on an outer rim of a dock of the robot 210. A plurality of the signals emitters 221 are configured on the recharging dock 220. Each of the signals emitters 221 may emit the optical signals at a β angle. In another example, the signal receiver may not only be configured on the rim of the dock of the robot, and may be configured on any place of an outer surface of the robot.

In one example, the robot may conduct the recharging alignment method when the robot detects electrical power is lower than a predetermined value. Such that, the robot may align with the recharging dock, and may plan a route return to the recharging dock for automatic recharging. The robot may perform the recharging alignment method to align with the recharging dock by rotating and without moving.

Specifically, the robot may rotate along a first direction and may adjust the signal receiver to a first critical point. Wherein the signal receiver is configured to receive the optical signals emitted from the recharging dock of the first critical point. In an example, the first direction is a clockwise direction. That is, if the signal receiver is further rotated in the first direction, the signal receiver may not be configured to receive the optical signals emitted from the recharging dock. The robot may obtain position information of the first critical point. As shown in FIG. 2, a reference direction X is configured in the robot 210 in advance. The robot 210 may rotate clockwise to the first critical point A with a center of the chassis as a rotation center O, such that, a first deflection angle θ1 between the first critical point A and the reference direction X may be obtained.

In S12: adjusting the signal receiver from the first critical point to a second critical point to obtain position information of the second critical point, wherein the signal receiver is configured to receive the optical signals of the second critical point.

For example, after the signal receiver is adjusted to the first critical point, the robot may adjust the signal receiver to the second critical point along the second direction. In an example, the second direction is a counterclockwise direction. Wherein the signal receiver is configured to receive the optical signals emitted from the recharging dock of the second critical point. That is, if the signal receiver is further rotated in the second direction, the signal receiver may not be configured to receive the optical signals emitted from the recharging dock. The first critical point and the second critical point are at different position. The robot may obtain position information of the second critical point. As shown in FIG. 2, the reference direction X is configured in the robot 210 in advance. The robot 210 may rotate counter-clockwise to the second critical point B with the center of the chassis as the rotation center O, such that, a second deflection angle $\theta2$ between the second critical point B and the reference direction X may be obtained.

It is noted that the position information of the first critical point and the second critical point are not limited to the deflection angle. In another example, the position information may be other information, such as distance, indicating locations of the first critical point and the second critical point.

The first direction may be the same with or opposite to the second direction. In one example, one of the first direction and the second direction may be clockwise, and the other one of the first direction and the second direction may be counter-clockwise. For example, the first direction may be clockwise and the second direction may be counter-clockwise, or the first direction may be counter-clockwise and the second direction may be clockwise.

In S13: determining a mid-point of the first critical point and the second critical point according to the position information of the first critical point and the second critical point, and adjusting the signal receiver to the mid-point to align with the recharging dock.

After the signal receiver is adjusted to the second critical point, the mid-point of the first critical, point and the second critical point may be obtained according to the position information of the first critical point and the second critical point. Wherein, the mid-point of the first critical point and the second critical point may be a middle point of a path that the signal receiver is rotated from the first critical point to the second critical point. Thai is, the mid-point may be a point M located on a bisector of rotating angle of the first critical point and the second critical point. As shown in FIG. 2, after the robot obtains the first deflection angle of the first critical point and the second deflection angle of the second critical point, a deflection angle difference: between the mid-point M of the first critical point and the second critical point and the second critical point B may be obtained from the equation (1). That is, the deflection angle difference is an angle difference between the deflection angle of the mid-point M relative to the reference direction X and the deflection angle of the second critical point B relative to the reference direction X.

$$\Delta\theta=|(\theta1-\theta2)/2| \quad (1)$$

The optical signals emitted from the signals emitter of the recharging dock may have a certain angle range. The angle range of the optical signals may be determined by conducting the step S11 and the step S12 to obtain the first critical point and the second critical point. The signal, receiver may receive the optical signals within the range between the first critical point and the second critical point. Theoretically, the mid-point of the first critical point and the second critical point may be the position corresponding to the signals emitted device of the recharging dock. Thus, the robot may obtain the position information of the mid-point of the first critical point and the second critical point, and may rotate the signal receiver to the mid-point M according to the position information, so as to align the signal receiver of the robot with the signals emitter of the recharging dock. Referring to FIG. 2, the robot may rotate from the second critical point B along the clockwise direction, the rotating angle may be equal, to the deflection angle difference $\Delta\theta$, such that the signal receiver 211 may be rotated to the mid-point M. Wherein a third deflection angle $\theta3$ between the mid-point M and the reference direction X is configured to be a sum of a minimum value among the first deflection angle and the second deflection angle, and the deflection angle difference $\Delta\theta$. That is, $\theta3=\min(\theta1, \theta2)+\Delta\theta$. As such, the signal receiver 211 may align with the signals emitter 221.

In one example, after conducting the step S13, the robot may obtain a distance between the center of the chassis, i.e. the rotation center) and the signals emitter of the recharging dock. Specifically, a distance between the signals emitter of the recharging dock and the signal receiver of the robot may be obtained according to an intensity of the optical signals. The sum of the distance between the signals emitter and the signal receiver, and the distance between the rotation center and the signal receiver, i.e. a sum of a distance d and a radius of the chassis r as shown in FIG. 2, are configured to be the distance between the rotation center of the robot and the signals emitter of the recharging dock. As such, the robot may plan the route for returning to the recharging dock. Or due to the current signal receiver has aligned, to the recharging dock, the robot may return to the recharging dock along a direction from the rotation center to signal receiver. The robot, may re-conduct the step S11 to S13 to adjust the direction during the returning process. In another example, the recharging dock may be of a vertical structure. In the application of conducting the recharging process on a vertical portion of the rim of the robot, the robot may directly configure the distance between the signals emitter of the recharging dock and the signal receiver of the robot to be a distance between the robot and the recharging dock (the distance d as shown in FIG. 2), the robot may plan the route for returning to the recharging dock according to the distance between the robot and the recharging dock, In one example, the robot may respectively rotate to the first critical point and the second critical point, may adjust the signal receiver to the mid-point of the first critical point and the second critical point, and may rotate to a position located between the first critical point and the second critical point. The direction from the rotation center to the mid-point of the first critical point and second critical point is even closer to the position of the signals emitter of the recharging clock. Therefore, after the signal receiver is rotated to the mid-point of the first critical point and the second critical point, the signal receiver of the robot may align with the signals emitter of the recharging dock even more accurate.

Figure 3:
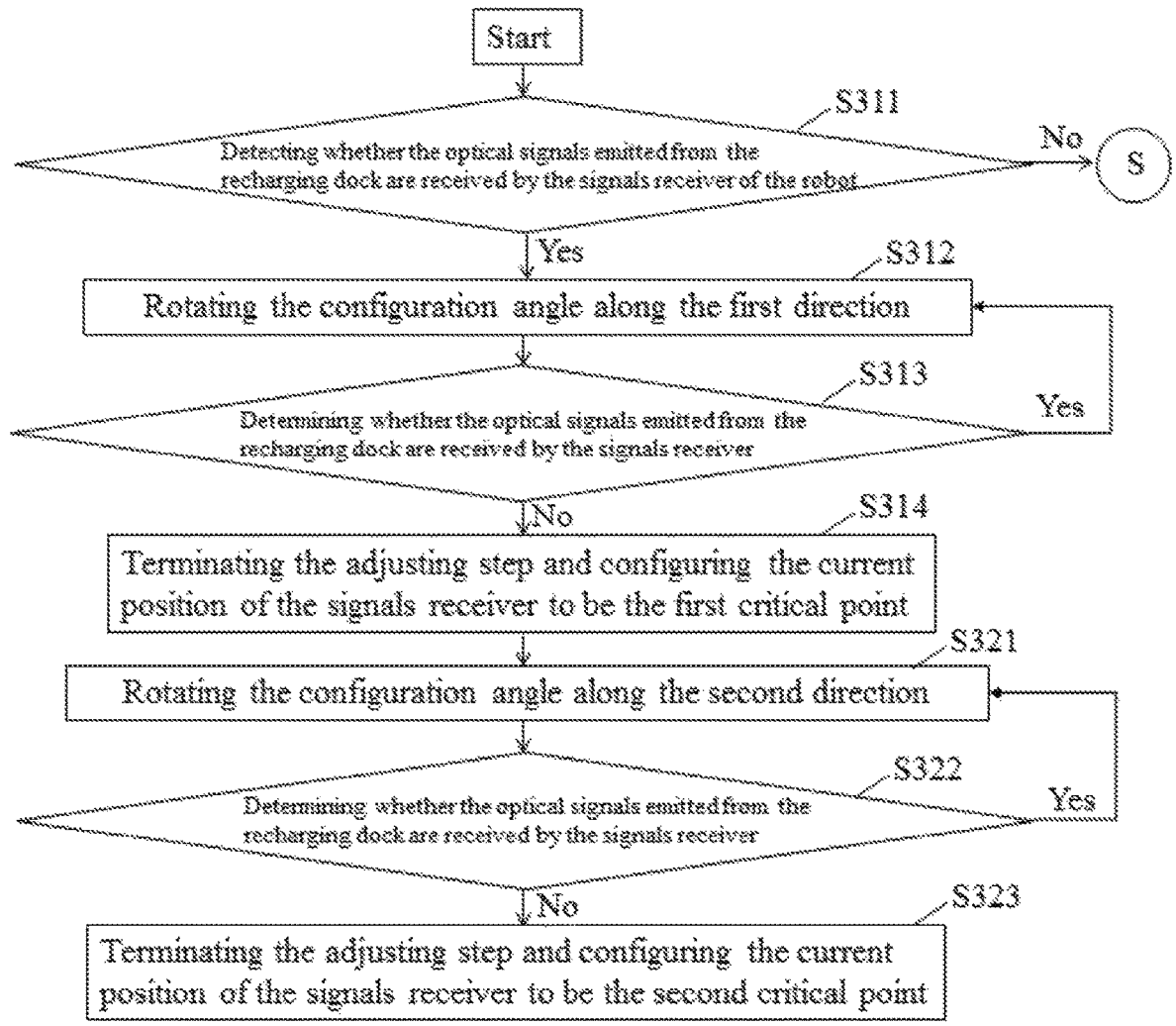
FIG. 3 is a flowchart illustrating the step S11 and the step S22 in accordance with one embodiment of the present disclosure.

Referring to FIG. 3, in one embodiment, the first direction is opposite to the second direction. The difference between this embodiment and the above embodiment resides in that the step S11 may further include the following step.

Figure 4:
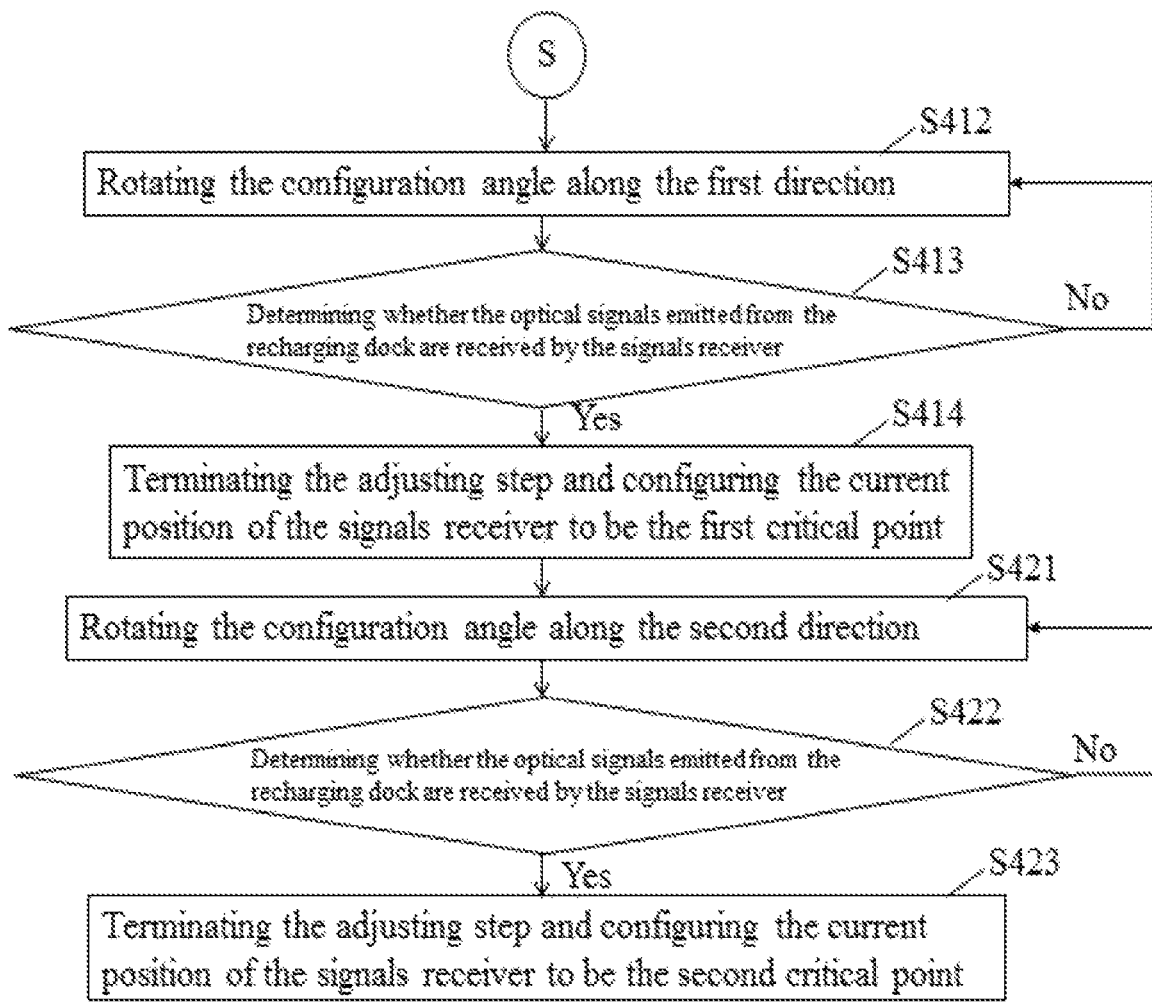
FIG. 4 is a flowchart illustrating the step S11 and the step S22 in accordance with another embodiment of the present disclosure.

In S311: detecting whether the optical signals emitted from the recharging dock are received by the signal receiver of the robot. If the optical signals emitted from the recharging dock are received by the signal receiver of the robot, the process goes to step S312. If the optical signals emitted from the recharging dock are not received by the signal receiver of the robot, the process may be terminated or the process may go to step S412 to S423 as shown in FIG. 4.

In step S312: rotating a configuration angle along the first direction upon determining the optical signals emitted from the recharging dock are received by the signals receiving device.

The configuration angle may be configured according to user voice, touch screen, instruction, inputted by keys, or the robot may obtain the configuration angle according to a previous rotation angle determined by machine learning.

In step S313: determining whether the optical signals emitted from the recharging dock is received by the signal receiver. If the optical signals emitted from the recharging dock are received by the signal receiver, re-conducting the step S312. If the optical signals emitted from the recharging dock are not received by the signal receiver, the process goes to S314.

In step S314: rotating the configuration angle along the second direction and configuring a current positon of the signal receiver to be the first critical point.

The robot may configure the configuration angle to be the rotation angle in each time. When the rotation angle is rotated along the first direction, detecting whether the optical signals emitted from the signals emitter of the recharging dock is received by the signal receiver of the robot. If the optical signals emitted from the signals emitter of the recharging dock are received by the signal receiver of the robot, it is determined that the critical point is not reached, so that, the rotation process continues. If the optical signals emitted from the signals emitter of the recharging dock are not received by the signal receiver of the robot, it is determined that the critical point has been passed. So that the rotation angle may be rotated in a reverse direction, and the current position of the signal receiver may be configured to be the critical point.

The difference between this embodiment and the above embodiment resides in that the step S12 may further include the following step.

In step S321: adjusting the signal receiver with the configuration angle along the second direction.

Wherein the configuration angle may be configured according to user voice, touch screen, instruction, inputted by key, or the robot may obtain the configuration angle according to the previous rotation angle determined by machine learning. The robot may start to rotate from the first critical point to the second critical point.

In step S322: determining whether the optical signals emitted from the recharging dock is received by the signal receiver. If the optical signals emitted from the recharging dock are received by the signal receiver, re-conducting the step S321. If the optical signals emitted from the recharging dock are not received by the signal receiver, the process goes to S323.

In step S323: rotating the configuration angle along the first direction and configuring the current positon of the signal receiver to be the second critical point.

The same as the sub-step of S11, the robot may configure the configuration angle to be the rotation angle in each time. When the rotation angle is rotated along the second direction, detecting whether the optical signals emitted from the signals emitter of the recharging dock is received by the signal receiver of the robot. If the optical signals emitted from the signals emitter of the recharging dock are received by the signal receiver of the robot, it is determined that the critical point is not reached, so that, the rotation process continues. If the optical signals emitted from the signals emitter of the recharging dock are not received by the signal receiver of the robot, it is determined that the critical point has been passed. So that the rotation angle may be rotated in the reverse direction, and the current position of the signal receiver may be configured to be the critical point It is noted that in the step S313 and step S323, the critical point may be configured to be the position where the optical signals emitted from the signals emitter of the recharging dock are not received by the signal receiver of the robot, that is, the reverse potation process may not be conducted.

In another example, after conducting the step S311 to step S314, the robot may adjust the configuration angle along the first direction and may determine whether the optical signals emitted from the recharging dock is received by the signal receiver instead of conducting the step S321 to S323. If the optical signals emitted from the recharging dock are not received by the signal receiver, re-conducting the step. If the optical signals emitted from the recharging dock are received by the signal receiver, the process may be terminated and the current, position may be configured to be the second critical point.

Referring to FIG. 4 in one embodiment the first direction is opposite to the second direction. The difference between this embodiment and the above embodiment resides in that the step S11 may further include the following step.

In step S411: detecting whether the optical signals emitted from the recharging dock are received by the signal receiver of the robot. If the optical signals emitted from the recharging dock are not received by the signal receiver of the robot, the process goes to step S412. If the optical signals emitted from the recharging dock are received by the signal receiver of the robot, the process may be terminated or the process may go to step S312 to S323 as shown in FIG. 3.

In step 412: rotating the configuration angle along the first direction upon determining the optical signals emitted from the recharging dock are not received by the signals receiving device.

Wherein the configuration angle may be configured according to user voice, touch screen, instruction inputted by key, or the robot may obtain the configuration angle according to the previous rotation angle determined by machine learning.

In step S413: determining whether the optical signals emitted from the recharging dock are received by the signal receiver. If the optical signals emitted from the recharging dock are not received by the signal receiver, re-conducting the step S412. If the optical signals emitted from the recharging dock are received by the signal receiver, the process goes to S414.

In step S414: terminating the adjuring step and configuring the current position of the signal receiver to be the first critical point.

In one example, the first direction is opposite to the second direction. The robot may configure the configuration angle to be the rotation angle in each time. When the rotation angle is rotated along the first direction, detecting whether the optical signals emitted from the signals emitter of the recharging dock is received by the signal receiver of the robot. If the optical signals emitted from the signals emitter of the recharging dock are not received by the signal receiver of the robot, it is determined that the critical point is not reached, so that, the rotation process continues. If the optical signals emitted from the signals emitter of the recharging clock are received by the signal receiver of the robot, it is determined that the critical point has been passed, and the current position may be configured to be the critical point.

The difference between this embodiment and the above embodiment resides in that the step S12 may further include the following step.

In step S421: rotating the configuration angle along the second direction upon determining the optical signals emitted from the recharging dock are not received by the signals receiving device.

In step S422: determining whether the optical signals emitted from the recharging dock-is received fay the signal receiver. If the optical signals emitted from the recharging dock are not received by she signal receiver, re-conducting the step S421. If the optical signals emitted from the recharging dock are received by the signal receiver, the process goes to S421.

In step S423: terminating the adjusting step and configuring the current position of the signal receiver to be the second critical point.

The same as the sub-step of S11, the robot may configure the configuration angle to be the rotation angle in each time. When the rotation angle is rotated along the second direction, detecting whether the optical signals emitted from the signals emitter of the recharging dock is received by the signal receiver of the robot. If the optical signals emitted from the signals emitter of the recharging dock are not received by the signal receiver of the robot, it is determined that the critical point is not reached, so that, the rotation process continues. If the optical signals emitted from the signals emitter of the recharging dock are received by the signal receiver of the robot, it is determined that the critical point has been passed, and the current position may be configured to be the critical point.

In another example, after conducting the step S411 to step S414, the robot may adjust the configuration angle along the first direction and may determine whether the optical signals emitted from the recharging dock is received by the signal receiver instead of conducting the step S421 to S423. If the optical signals emitted from the recharging dock are received by the signal receiver, re-conducting the step S412. If the optical signals emitted from the recharging dock are not received by the signal receiver, rotating the configuration angle along the second direction and configuring the current position of the signal receiver to be the second critical point.

In another aspect the recharging alignment method may further include the following steps.

In step S511: configuring a signal state to be on upon determining the optical signals have been received, and configuring a signal state to be off upon determining the optical signals have not been received.

In step S512: detecting a signal state of a current position of the signal receiver.

In step S513: rotating the signal receiver by the configuration angle along the first direction, and setting the current position as the first critical point until the signal state has been changed.

In step S514: rotating the signal receiver by the configuration angle along the second direction, and setting the current position as the second critical point until the signal state has been changed.

In an example, the first direction is a clockwise direction, and the second direction is a counterclockwise direction. In another example, the first direction Is a counterclockwise direction, and the second direction is a clockwise direction.

In one example, the recharging dock may include a plurality of the signals emitter. Wherein each of the signals emitters is configured with corresponding identification information, and the robot is configured to align with one of the signals emitter. The step S313, S322, S413, and S422 may include: detecting whether the optical signals emitted from the recharging dock, which are configured with pre-determined identification information, are received by the signal receiver of the robot. Specifically, when the signal receiver of the robot receive the optical signals emitted from the recharging dock, the robot may extract the identification information of the optical signals and may determine whether the extracted identification information is the predetermined identification information. If the extracted identification information is the predetermined identification information, the process may go to the corresponding steps. If the extracted identification information is not the predetermined identification information, it is determined the optical signals, having the identification information, are not received by the signal receiver, and the process may go to the corresponding steps.

It is noted that the predetermined identification information may be the identification information emitted by one of the signals emitters. The predetermined identification information may be inputted according to users in advance or may be the earliest-received identification information of the optical signals or the strongest-received identification information of the optical signals when the robot needs to recharge. The predetermined identification information is not limited in the present disclosure. For example, the predetermined identification information may be 0x53. The signal receiver may receive infrared data, indicating 0x53, emitted from the recharging dock in between the first critical point and the second critical point. The signal receiver may not receive the infrared data, or may receive a valid infrared data, emitted from the recharging dock outside of the range between the first critical point and the second critical point, wherein the invalid signals may include 0 or 0xff.

In one example, the optical signals may be the infrared signals or any other light signals, such as laser signals.

In view of the above, the robot may rotate along the first direction and the second direction to determine the first critical point and the second critical point. The signal receiver may be rotated to the mid-point of the first critical point and the second critical point. As such, the robot may align with the recharging dock without moving, so as to simplify the alignment process.

Figure 5:
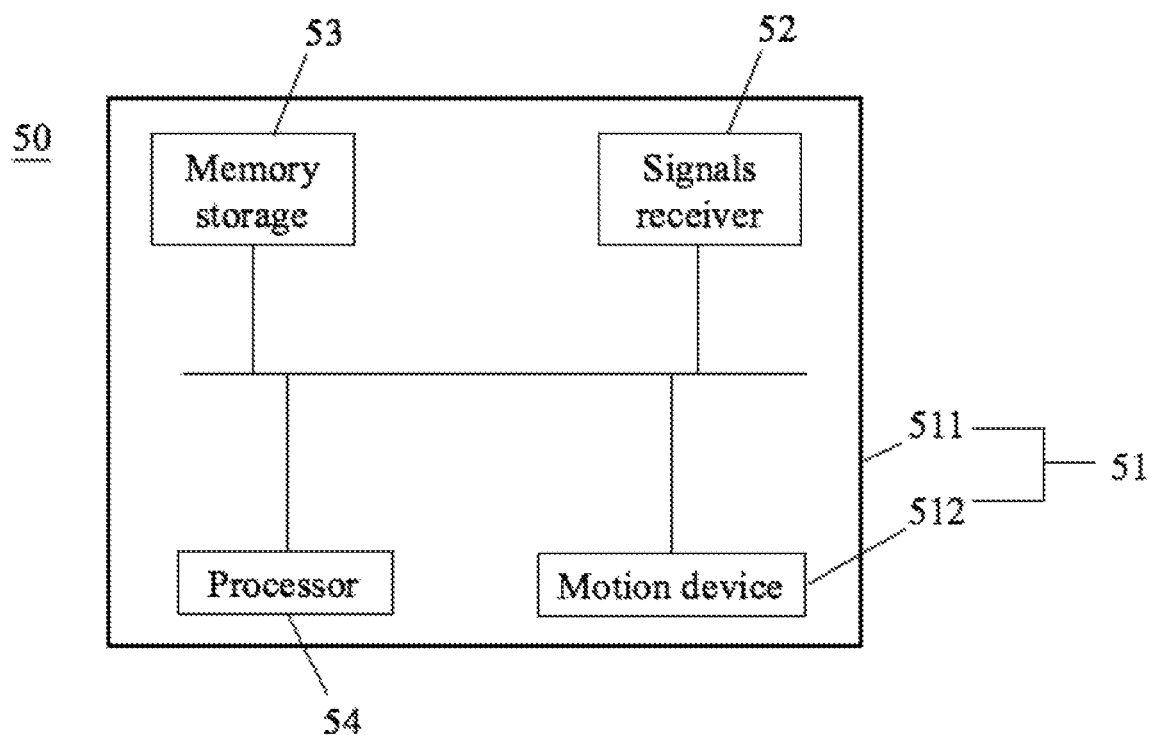
FIG. 5 is a schematic view of a robot in accordance with one embodiment of the present disclosure.

Referring to FIG. 5, the robot 50 may include a robot body 51, a signal receiver 52, at least one memory storage 53, and at least one processor 54. FIG. 5 is an example illustrating the robot includes one memory storage and one processor. Wherein the signal receiver 52 is configured on the robot body 51, and the robot may further include a rechargeable Battery, which is not shown in FIG. 5.

The robot body 51 is controlled by the processor 53 and is configured to perform the instructions. The robot body may further include a housing 511 and a motion device 512 configured within the housing 511. Wherein the motion device 512 is configured to move and rotate the robot body 51 when being controlled by the processor 54. In another embodiment the motion device may further include actuators, such as a robot arm, a foot, an omnidirectional wheel, a sweeping element, and a driver driving the actuators. The memory storage 53 and the processor 54 are configured within the housing 511 of the robot body 51. The signal receiver 52 may be configured on an outer surface of the robot body 51. For example, as shown in FIG. 2, the signal receiver 52 may be configured on the rim of the chassis of the robot. Specifically, the robot may be the sweeping robot, wherein the housing 511 may be in shape of, but is not limited to, circle or oval.

The signal receiver 52 is configured to receive the optical signals emitted from an external device, such as the recharging dock. Specifically, the signal receiver 52 may connect with the processor 34 via a data communication bus, such that the signal receiver 52 may transmit optical signals data to the processor 54.

The memory storage 53 is configured to store computer applications, to provide the computer applications to the processor 54, and to store data that has been processed by the processor 54. For example, the optical signals received by the signal receiver 52. Wherein the memory storage 53 may include at least one of read memory, random access memory, and nonvolatile random access memory (NVRAM).

In one example, the processor 54 may access the computer application stored in the memory and is configured to control the robot body 51 to rotate the signal receiver 52 to the first critical point to obtain the position information of the first critical point. Wherein the signal receiver 52 is configured to receive the optical signals emitted from the recharging dock of the first critical point. The processor 54 is further configured to control the robot body 51 to rotate from the first critical point to the second critical point to obtain the position information of the second critical point. The processor 54 is further configured to determine the mid-point of the first critical point and the second critical point according to the position information of the first critical point and the second critical point, and configured to control the robot body 51 to rotate the signal receiver 52 to the mid-point, so as to align with the recharging dock.

In one example, the position information of the first critical point may be the first deflection angle θ1 relative to the reference direction of the robot, and the position information of the second critical point may be the second deflection angle θ2 relative to the reference direction of the robot.

The processor 54 is further configured to compute the deflection angle difference Δθ between the mid-point of the first critical point and the second critical point, and the second critical point, which is equal to |(θ1-θ2)/2|, according to the first deflection angle θ1 and the second deflection angle θ2. The processor 54 is further configured to control the robot body 51 to rotate the signal receiver from the second critical point to a position having the third deflection angle θ3 of the reference direction until reaching the mid-point. herein third deflection angle θ3 is configured as be the sum of the minimum value among the first deflection angle and the second deflection angle and the deflection angle difference Δθ.

In another example, the processor 54 is further configured to detect whether the optical signals are received by the recharging dock, adjust the robot 51 along the first direction and determine whether the optical signals emitted from the recharging dock are received by the signal receiver 52 each time when adjusting the robot with the configuration angle. If the optical signals emitted from the recharging dock are not received by the signal receiver 52, the processor 54 may re-conduct the adjusting step. If the optical signals emitted front the recharging dock are received by the signal receiver 52, the processor 54 may terminate the adjusting step, configure the current position of the signal receiver to be the first critical point, and obtain the position information of the first critical point.

The processor 54 is further configured to rotate the robot body 51 along the second direction and determine whether the optical signals emitted from the recharging dock are received by the signal receiver each time when, adjusting the robot with the configuration angle. If the optical signals emitted from, the recharging dock are not received by the signal receiver 52, the processor 54 may re-conduct the adjusting step. If the optical signals emitted from the recharging dock are received by the signal receiver 52, the processor 54 may terminate the adjusting step, configure the current position to be the second critical point, and obtain the position information of the second critical point. Or the processor 54 may rotate the robot along the first direction and determine whether the optical signals emitted from the recharging dock are received by the signal receiver 52 each time when adjusting the robot with the configuration angle. If the optical signals emitted from the recharging dock are received by the signal receiver 52, the processor 54 may re-conduct the adjusting step. If the optical signals emitted from the recharging dock are not received by the signal receiver 52, the processor 54 may rotate the robot body 51 with the configuration angle along the second direction, configuring the current position to be the second critical point, and obtain the position information of the second critical point.

In another aspect, the processor 54 is further configured to configure a signal state to be on upon determining the optical signals have been received by the signal receiver 52, and configure a signal state to be off upon determining the optical signals have not been received by the signal receiver 52. The processor 54 is further configured to detect a signal state of a current position of the signal receiver 52, to rotate the signal receiver 52 by the configuration angle along the first direction, to set the current position of the signal receiver 52 as the first critical point until the signal state has been changed. The processor 54 is further configured to rotate the signal receiver 52 by the configuration angle along the second direction, to set the current position as the second critical point until the signal state has been changed.

Wherein the first direction may be opposite to the second direction.

In one example, the optical signals may be the infrared signals.

The processor 54 may be a central processing unit (CPU). In one example, each components of the robot may be coupled together via a bus. For example, the signal receiver 52, the memory storage 53, the processor 54, and the motion device 512 of the robot may be connected together by the bus. Wherein the bus may include: data bus. power supply bus, control bus, and state signals bus.

In another example, the processor 54 may be an integrated circuit (IC) chip configured to process the signals. The alignment method of the present disclosure may be completed by integrated logic of hardware or instructions of software form of the processor 54. The processor 54 may be a general purpose processor, a digital signals processor (DSP), an application specific integrated circuit (ASIC), a programmable gate array (FPGA), other programmable logic devices, discrete gate or transistor logic devices, or discrete hardware components. The general processor may be a microprocessor or any other conventional processors. The alignment method in the present disclosure may be directly adopted in a hardware decoding processor or in hardware of decoding processor and combination of software modules. The software module may be configured in random storage memory, flash memory, read-only memory, programmable read-only memory, electrically rewritable programmable memory, or register. The storage media may be configured in the storage memory 53. The processor 54 may access the corresponding information from the storage memory and combines the hardware to complete the alignment method.

The present disclosure further relates to a robot system. As shown in FIG. 2, the robot system includes the robot 210 and the recharging dock 220, The recharging dock 220 is configured to recharge the robot 210. The recharging dock 220 may include at least one signals emitter 221 configured to emit the optical signals, such as infrared signals. Such that, the robot 210 may align with and return to the recharging dock 220 according to the optical signals. The robot 210 may include the signal receiver 211 configured to receive the optical signals emitted from the signals emitter 221. When the robot satisfies a recharging condition, such as power is lower than a predetermined value, the robot may conduct the alignment method. As such, the signal receiver 211 may align with and return to the recharging dock 220 for recharging. Specifically; the robot 210 may be the robot shown in FIG. 5.

Figure 6:
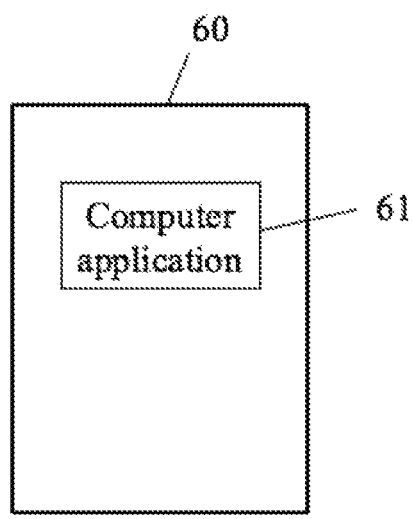
FIG. 6 is a schematic view of a nonvolatile, storage media in accordance with one embodiment of the present disclosure.

The present disclosure further relates to a nonvolatile storage media. As shown in FIG. 6, the storage media 60 is configured to store the computer applications 61 executable by the processor, and the computer applications 61 is configured to conduct the alignment method.

In view of the above, the robot may respectively rotate to the first critical point and the second critical point, determine the optical, signals are within the cover range between the first critical point and the second critical point, adjust the signal receiver to the mid-point of the first critical point and the second critical point, and may rotate to a position, located between the first critical point and the second critical point. The mid-point of the first critical point and the second critical point may indicate the position of the signals emitter of the recharging dock move accurately. Such that, the accurate alignment to the recharging dock of the robot may be achieve.

It should be understood that the disclosed method and apparatus may be implemented in other ways. For example, the embodiment of the apparatus described above is merely illustrative. For example, the module or unit is only a logical function, and there may be additional ways to implement the module or unit. In one example, multiple units or components may be combined or may be integrated into another system. In one example, some features may be ignored or excluded.

The units may be a separate component. That is, the units may or may not be physically separated., i.e., the unit may be located in one place or may be distributed to multiple networks. It can be understood that some or all of the units may be configured in accordance with the actual needs so to achieve the object of the present embodiment.

In addition, each of the functional units in the various embodiments of the present invention may be integrated into one processing unit. Each of the units may be physically present, or two or more units may be integrated into one unit. The above-mentioned integrated unit can be implemented either in the form of hardware or in the form of software functional units.

The integrated units in the above-described other embodiments may be stored in a computer-readable storage medium when being implemented in the form of software functional units and are sold or used as stand-alone products. Based on this understanding, the technical solution of the present disclosure, either essentially or in part, contributes to the prior art, or all or part of the technical solution may be embodied in the form of a software product stored in a storage medium. In an example, the computer-readable storage medium includes a number of instructions for enabling a computer device (which may be a personal computer, a server, a network device, etc.) or a processor to perform all or part of the steps of the methods described in the various embodiments of the present disclosure. The aforementioned storage medium includes a variety of media such as a USB disk, a mobile hard disk, a read-only memory, a random access memory (RAM), a magnetic disk, or an optical disk.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A recharging alignment method of a robot, comprising:
adjusting a signal receiver of the robot to a first critical point to obtain position information of the first critical point, wherein the signal receiver is configured to receive optical signals emitted from a recharging dock of the first critical point;
adjusting the signal receiver from the first critical point to a second critical point to obtain position information of the second critical point, wherein the signal receiver is configured to receive the optical signals of the second critical point;
determining a mid-point of the first critical point and the second critical point according to the position it of the first critical point and the second critical point; and
adjusting the signal receiver to the mid-point to align with the recharging dock;
wherein the position information of the first critical point is a first deflection angle of the first critical point relative to a reference direction of the robot, and the position information of the second critical point is a second deflection angle of the second critical point relative to the reference direction of the robot;
the step of determining a mid-point of the first critical point and the second critical point according to the position information of the first critical point and the second critical point and adjusting the signal receiver to the mid-point to align with the recharging dock further comprises;
configuring a deflection angle difference between the mid-point and the second critical point to he half of an absolute difference value between the first deflection angle and the second deflection angle; and
adjusting the signal receiver from the second critical point to a position having a third deflection angle of the reference direction until reaching the mid-point, wherein the third deflection angle is configured to be a sum of a minimum value among the first deflection angle and the second deflection angle, and the deflection angle difference.

2. The recharging alignment method according to claim 1, wherein the step of adjusting a signal receiver of a robot to a first critical point further comprises:
configuring a signal state, to be on upon determining the optical signals have, been received, and configuring a signal state to be off upon determining the optical signals have not been received;
detecting a signal state of a current position of the signal receiver;
rotating the signal receiver by a configuration angel along a first direction, and setting the current position as a first critical point until the signal state has been changed;
rotating the signal receiver by the configuration angel along a second direction, and setting the current position as a second critical point until the signal state has been changed.

3. The recharging alignment method according to claim 2, wherein recharging alignment method further comprises:
    detecting whether the optical signals are configured with identification information, wherein the optical signals emitted from signal transmitters of the recharging dock are different from each other.

4. The recharging alignment method according to claim 1, wherein the optical signals are infrared signals.

5. An automatic recharging robot, comprising;
    a robot body, a memory storage, a signal receiver configured on the robot body, and a processor;
    wherein the signal receiver is configured to receive optical signals emitted from an external device;
    the memory storage is configured to store computer programs;
    the processor is configured to conduct the computer programs to:
    control the robot body to rotate to a first critical point to receive the optical signals emitted from a recharging dock to obtain position information of the first critical point;
    control the robot body to rotate from the first critical point to a second critical point to receive the optical signals to obtain position information of the second critical point;
    determine a mid-point of the first critical point and the second critical point according to the position information of the first critical point and the second critical point;
    control the signal receiver to the mid-point to align with the recharging dock;
    wherein the position information of the first critical point is a first deflection angle relative to a reference direction of the robot, and the position information of the second critical point is a second deflection angle relative to the reference direction of the robot;
    the processor is configured to:
    configure a deflection angle difference between the mid-point and the second critical point to be half of an absolute difference value between the first deflection angle and the second deflection angle; and
    adjust the signal receiver from the second critical point to a position having a third deflection angle of the reference direction and to reach the mid-point, wherein the third deflection angle is configured to be a sum of a minimum value among the first deflection angle and the second deflection angle, and the deflection angle difference.

6. The robot according to claim 5, wherein the processor is configured to:
    configure a signal state to be on upon determining die optical signals have been received, and configure a signal state to be off upon determining the optical signals have not been received;
    detect a signal state of a current position of the signal receiver;
    rotate the signal receiver by a configuration angel along a first direction, and set the current position as a first critical point until the signal state has been changed;
    rotate the signal receiver by the configuration angel along a second direction, and set the current position as a second critical point until the signal state has been changed.

7. The robot according to claim 6, wherein the processor is further configured to detect whether optical signals having identification setting information is received by the signal receiver, wherein the optical signals are emitted in different manner according to different signals emitters of the recharging dock.

8. A non-transitory computer readable medium containing one or more programs stored in a memory storage, the programs are configured to be executed by one or more processor for controlling a robot to:
    adjust a signal receiver of the robot to a first critical point to obtain position information of the first critical point, wherein the signal receiver is configured to receive optical signals emitted from a recharging dock of the first critical point;
    adjust the signal receiver from the first critical point to a second critical point to obtain position information of the second critical point, wherein the signal receiver is configured to receive the optical signals of the second critical point;
    determine a mid-point of the first critical point and the second critical point according to the position information of the first critical point and the second critical point; and
    adjust the signal receiver to the mid-point to align with the recharging dock;
    wherein the position information of the first critical point is a first deflection angle of the first critical point relative to a reference direction of the robot, and the position information of the second critical point is a second deflection angle of the second critical point relative to the reference direction of the robot;
    the one or more programs further control further control the robot to:
    configured a deflection angle difference between the mid-point and the second critical point to be half of an absolute difference value between the first deflection angle and the second deflection angle; and
    adjust the signal receiver from the second critical point to a position having a third deflection angle of the reference direction until reaching the mid-point, wherein the third deflection angle is configured to be a sim of a minimum value among the first deflection angle and the second deflection angle, and the deflection angle difference.

9. The non-transitory computer readable medium according to claim 8, wherein the one or more programs further control further control the robot to:
    configure a signal state to be on upon determining the optical signals have been received, and configuring a signal state to he off upon determining the optical signals have not been received;
    detect a signal state of a current position of the signal receiver;
    rotate the signal receiver by a Configuration angel along a first direction, and setting the current position as a first critical point until the signal state has been changed;
    rotate the signal receiver by the configuration angel along a second direction, and setting the current position as a second critical point until the signal state has been changed.

10. The non-transitory computer readable medium according to claim 8, wherein the one or more programs further control further control the robot to
    detect whether the optical signals are configured with identification information, wherein the optical signals emitted from signal transmitters of the recharging dock are different from each other.

11. The non-transitory computer readable medium according to claim 8, wherein the optical signals are infrared signals.

* * * * *